United States Patent [19]
Watts et al.

[11] Patent Number: 6,159,517
[45] Date of Patent: Dec. 12, 2000

[54] OIL FILLED ROUNDER BAR WITH GROOVES AND METHOD OF USING THE SAME

[75] Inventors: James L. Watts, Gwinnett, Ga.; Roland Lomerson, Richmond, Va.

[73] Assignee: The Dominion Companies, LLC, Richmond, Va.

[21] Appl. No.: 09/306,741

[22] Filed: May 7, 1999

[51] Int. Cl.[7] .............................. A21C 11/00; A21D 6/00
[52] U.S. Cl. ....................... 426/496; 425/332; 425/333; 425/364 R; 426/503; 426/512
[58] Field of Search .................................. 426/496, 503, 426/512, 518; 425/332, 333, 364 R, 374, 403

[56] References Cited

U.S. PATENT DOCUMENTS

| | | | |
|---|---|---|---|
| 4,008,025 | 2/1977 | Campbell | 425/96 |
| 4,306,850 | 12/1981 | Cummins | 425/332 |
| 5,264,232 | 11/1993 | Campbell | 426/503 |
| 5,270,070 | 12/1993 | Campbell | 426/503 |
| 5,356,652 | 10/1994 | Campbell | 426/503 |
| 5,714,178 | 2/1998 | Keener | 425/333 |
| 5,786,016 | 7/1998 | Campbell et al. | 425/332 |

*Primary Examiner*—George C. Yeung
*Attorney, Agent, or Firm*—Thomas, Kayden, Horstemeyer & Risley

[57] ABSTRACT

A preferred embodiment of the oil filled rounder bar with grooves for use with an endless belt-type conveyor for transporting dough pieces thereon incorporates a shaping surface formed of oil filled plastic material. The shaping surface forms a pocket with the belt of the conveyor and receives and shapes dough pieces transported along the belt of the conveyor. Preferably, an array of grooves are formed in the shaping surface to promote frictional engagement of the dough pieces with the shaping surface. Method aspects also are provided.

15 Claims, 6 Drawing Sheets

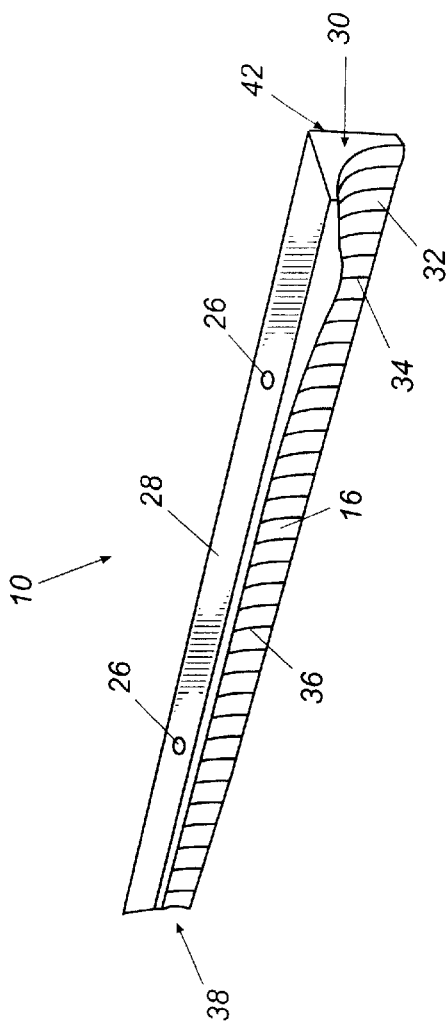
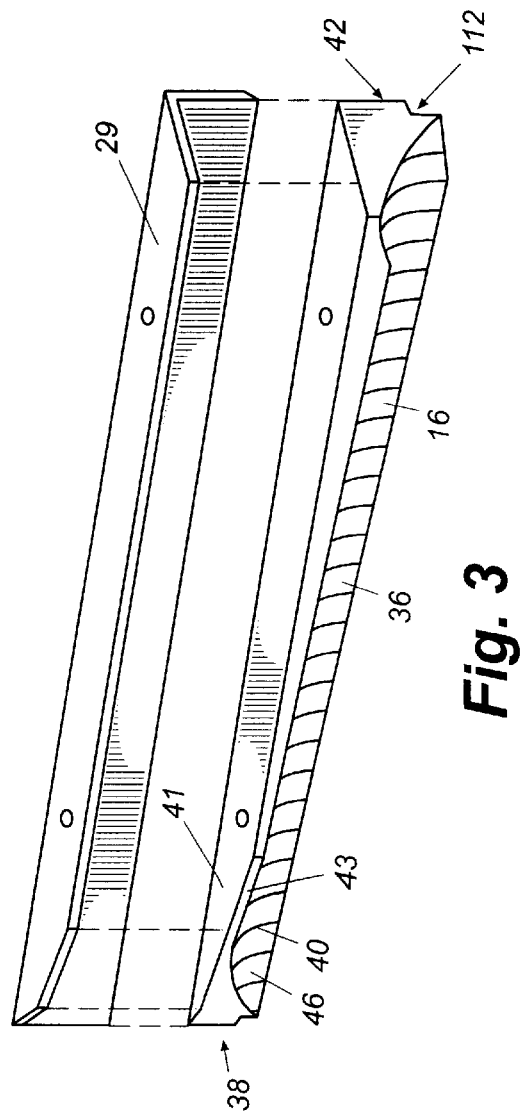

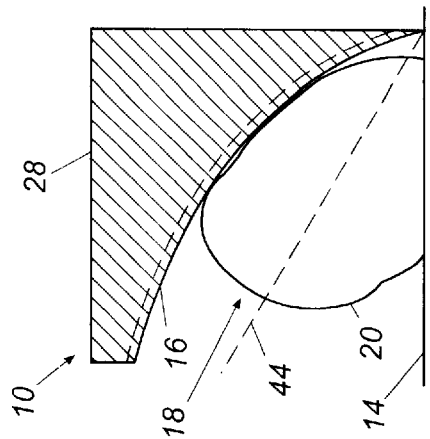
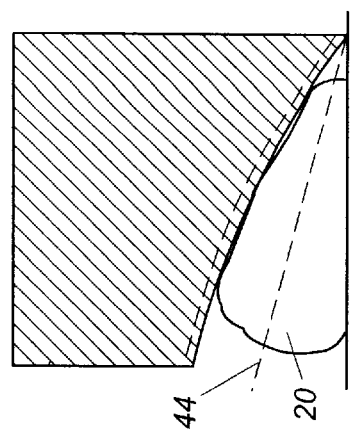
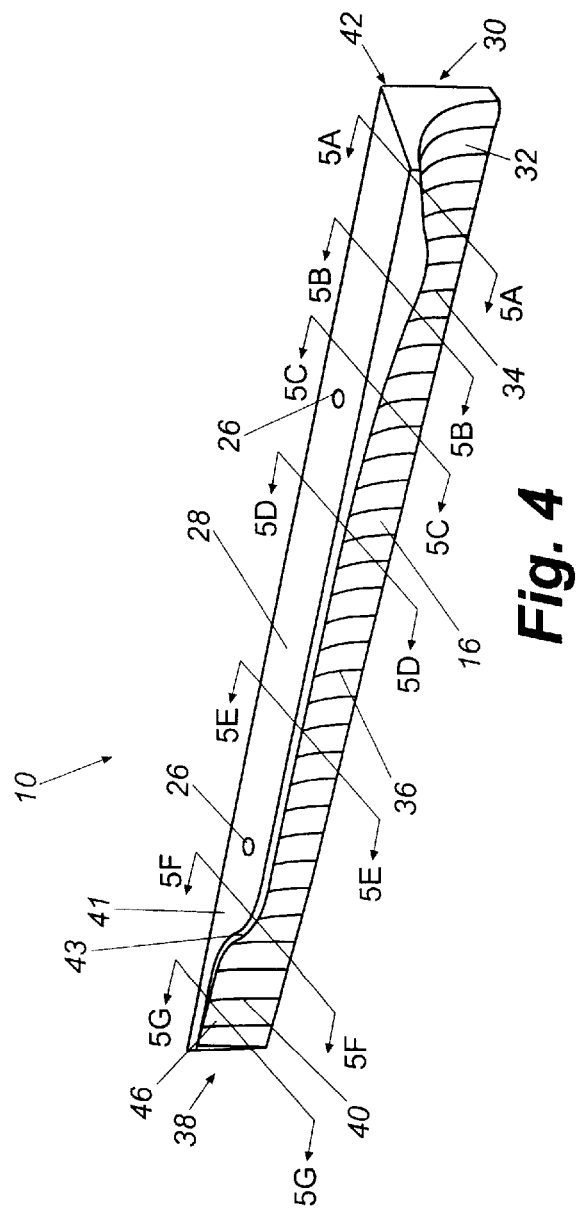

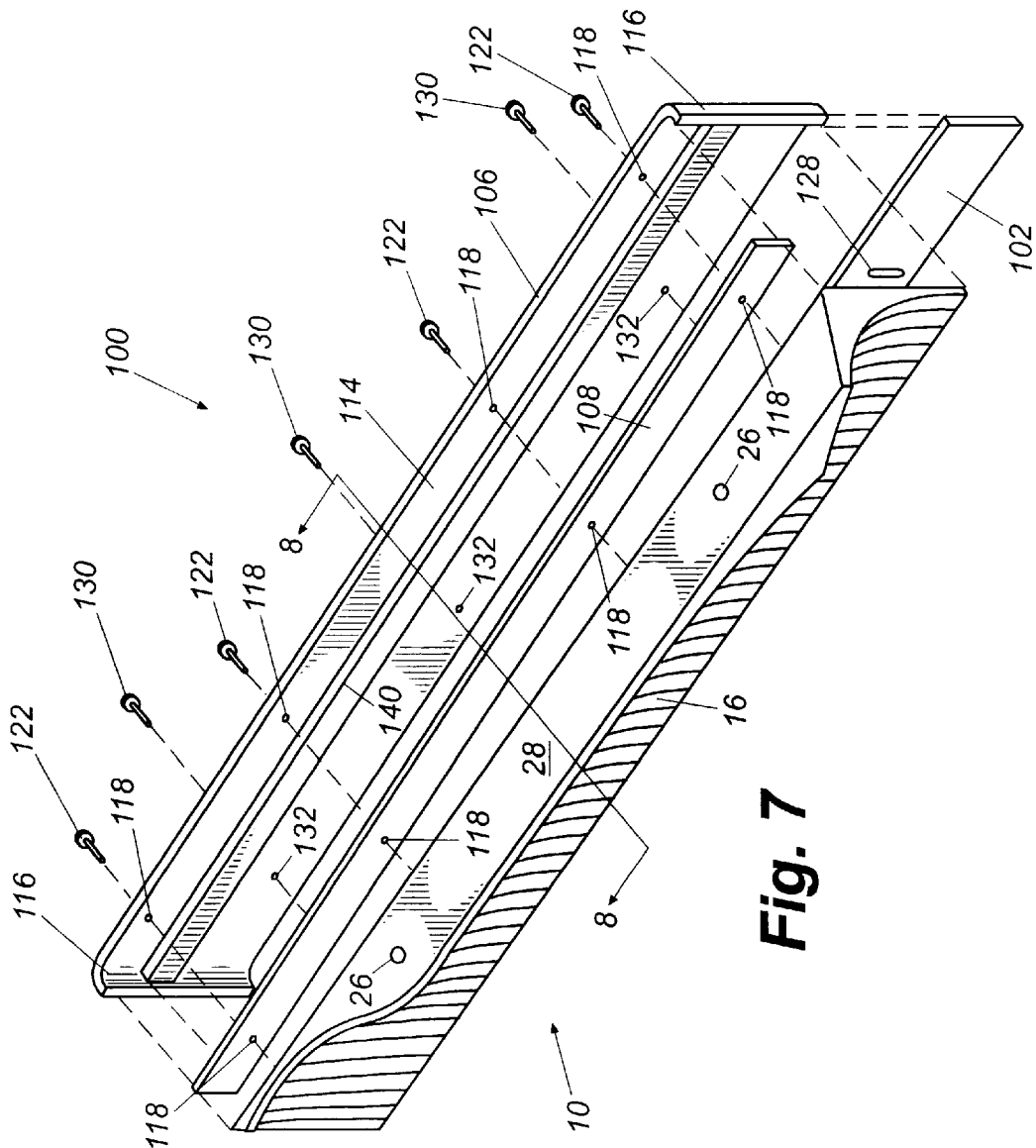
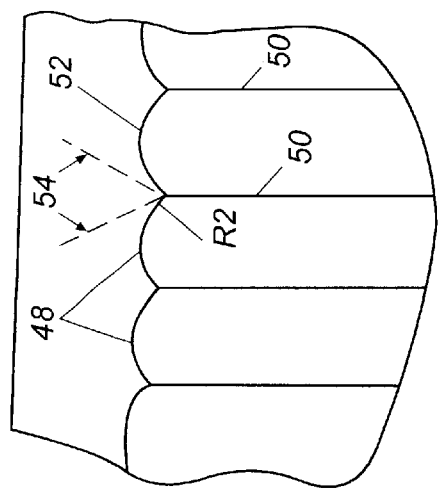
Fig. 7
Fig. 6

OIL FILLED ROUNDER BAR WITH GROOVES AND METHOD OF USING THE SAME

BACKGROUND OF THE INVENTION

1. Field of the Invention

The present invention relates to bakers' dough processing equipment. More specifically, the invention relates to a rounder bar with an improved shaping surface for converting pieces of dough divided from irregular hunks of dough into rounded spherical dough pieces as the dough pieces are conveyed on a belt of a surface conveyor along a dough processing path.

2. Description of the Related Art

In a typical commercial bread making process, baker's dough, which is primarily made of flour and water, is blended in a large mixer. A particularly high water content usually is desirable in the dough composition formed in the mixer because a high water content tends to make a softer baked product. Gluten, which is a component of flour, absorbs and retains the water which is added to the mixer so that a dough of a sticky paste-like consistency is made. After mixing, the sticky dough is then transferred, in a preferred method, to a stuffing pump which forms the dough into a stream or moving bar of dough that passes through a conduit to dough processing equipment. The processing equipment can include, among others, a dough distribution manifold which distributes the stream of dough into multiple streams of dough, a dough divider which continually divides the dough streams into pieces of dough of equal volume and deposits the dough pieces in multiple columns of dough pieces onto a moving belt of a surface conveyor for further processing along a processing path.

In order to produce high quality bread and roll-type bakery products, baker's dough processing typically includes the steps of rounding the volumetrically sized dough mass into a spherical shape and developing the outer skin of the sphere into a continuous rubber-like sheet. These steps, when accomplished correctly, result in a dough piece: (1) that is dryer on its outer surface, which improves downstream machinability; (2) that retains gas, which is a byproduct of the fermentation process, resulting in improved volume and grain structure; (3) that provides a more uniform outer crust in the baked-out product, and; (4) that provides a more uniform result when the dough piece is sheeted-out, e.g. flattened into a disk-like shape, or moulded, e.g. rolled up like a cigar.

Typically, divided dough pieces are delivered under the influence of gravity to the upper surface of an endless belt-type conveyor. Stationary rounder bars are positioned along the length of the belt and are angularly offset from the direction of travel of the belt. Rounder bars used for this purpose are disclosed, for example, in U.S. Pat. Nos. 4,008, 025, 4,306,850, 5,264,232, 5,270,070, 5,356,652, and 5,714, 178. Each of the rounder bars has a concave shaping surface which faces an oncoming column of dough pieces and which forms an elongated pocket with the belt for contacting and shaping the surfaces of the dough pieces as the dough pieces are moved along the shaping surface of the rounder bar by the conveyor belt.

When a dough piece is dropped on the belt of a surface conveyor and contacts the shaping surface of a rounder bar, the dough piece decelerates from the speed of the belt, i.e. to approximately ½ of the speed of the belt, and rotates on both the shaping surface of the rounder bar and the upper surface of the conveyor belt. This behavior is caused by frictional engagement of the outer surface of the dough piece with the shaping surface of the rounder bar and causes the dough piece to take on an approximately round shape, flattened only where it contacts the belt, as the dough piece is forced to rotate about various axes while passing down the length of the rounder bar. However, depending on certain characteristics, such as the shape of the shaping surface of the rounder bar, the coefficient of friction of the rounder bar, the stickiness of the dough pieces, etc, the dough pieces can sometimes stick to the rounder bar and lift away from the belt or, otherwise, fail to rotate down the length of the rounder bar as a homogeneous mass, thereby failing to obtain the desired rounded shape and causing individual dough pieces to slide and stick together, i.e. double-up. Therefore, it is known in the prior art to apply oil, i.e. vegetable oil, onto the shaping surface of the rounder bars in order to promote proper shaping of the dough pieces by reducing the tendency of the dough pieces to stick to the shaping surface and the belt. However, adding contaminates, such as vegetable oil, along a dough processing path produces undesirable results, such as allowing the dough piece to slide down the rounder bar, thereby changing the time that it takes for a dough piece to rotate down the length of the rounder bar and causing blemishes on the surface of the baked-out product.

In order to promote the rotation of dough pieces along the shaping surface of a rounder bar, some prior art rounder bars are formed with a roughened textured shaping surface. The roughened surface retards the sliding of the dough pieces against the shaping surface and a slick material formed over the roughened surface permits the dough pieces to release from the shaping surface. Some rounder bars also have incorporated a series of grooves cut into the shaping surface with the raised ridges formed between adjacent grooves acting as a roughened surface for retarding the sliding of the dough pieces.

Additionally, some prior art rounder bars incorporate a compression section of the shaping surface of the bar which has a progressively reduced cross-sectional area between the downwardly facing portion of the shaping surface and the upper surface of the belt of the conveyor through which the dough pieces advance. This constricted area progressively downwardly compresses or squashes the dough piece as the dough piece rolls against the rounder bar and the conveyor belt in order to promote rotation of the dough piece as a homogeneous mass of dough. Heretofore, the narrowest portion of a prior art compression section typically has been arranged as close as 12–14 inches from the entrance end of a rounder bar, thereby gradually increasing the downward squashing action on a dough piece as the dough piece travels the initial 12–14 inches along the length of the bar. However, if the downward squashing force created by the compression section of the rounder bar is too great, the axis of rotation of the dough piece is changed abruptly, oftentimes causing a dough piece to stutter along the length of the rounder bar, slip on the belt of the conveyor or, otherwise, advance un-uniformly and becoming misaligned with other dough pieces, and possibly improperly forming the dough pieces into an undesired shape. Therefore, it is known in the prior art to gradually increase the downward force applied by a rounder bar on a dough piece by extending the compression section of the rounder bar along at least the first 12 inches of the length of the rounder bar to decrease the severity of the downward slope of the shaping surface from the entrance of the bar to the compression section. However, the gradual downward slope of the sloping surface of the prior art rounder bars tends to allow slippage of the dough pieces against the shaping surfaces of the rounder bars, resulting in less shaping and developing of the exterior of the dough pieces.

Therefore, it is desirable to provide improved rounder bars which address these and other shortcomings of the prior art.

BRIEF SUMMARY OF THE INVENTION

Briefly stated, the present invention is directed to an improved rounder bar with a compression section arranged adjacent the entrance end of the bar that allows dough pieces to more efficiently form rounded exterior surfaces when rotating down the length of the rounder bar. In a preferred embodiment, the rounder bar is stationarily mounted above the upper belt of a surface conveyor and is adapted to engage the exterior surface of a dough piece being advanced by the belt of the surface conveyor along a dough processing path. The shaping surface of the rounder bar and the belt of the conveyor cooperate to form a pocket down the length of the rounder bar for shaping dough pieces as the dough pieces engage the shaping surface of the rounder bar.

In accordance with an aspect of the present invention, a preferred embodiment of the rounder bar incorporates a shaping surface which is formed of either oil filled plastic material or ultra high-molecular weight polyethylene (UHMW). The shaping surface preferably includes an entrance end, a compression section, an area of maximum compression, an expansion section and an exit end, with the shaping surface configured so that a dough piece first engages the shaping surface of the compression section at the entrance end. Once a dough piece engages the shaping surface, the dough piece begins to rotate against the compression section and the conveyor belt about a rotational axis. The compression section forms a progressively reduced height of the shaping surface with the conveyor belt along the processing path, thereby exerting an increasing downward force against the dough piece as the dough piece travels toward the area of maximum compression. After passing through the area of maximum compression, e.g. the portion of the shaping surface forming the minimum cross-sectional area with the conveyor belt, the dough piece enters the expansion section. The expansion section forms a progressively increased height of the shaping surface with the conveyor belt along the processing path, thereby exerting a decreasing downward force to the dough piece as the dough piece travels along the expansion section toward the exit end.

In accordance with another aspect of the present invention, some embodiments incorporate a shaping surface which includes a release section, with the release section being oriented between the expansion section and the exit end and forming a progressively increased height of the shaping surface with the conveyor belt along the processing path.

In accordance with still another aspect of the present invention, some embodiments incorporate a shaping surface which includes an array of alternating parallel ribs and grooves each extending approximately normal to the length of the rounder bar.

In accordance with yet another aspect of the present invention, some embodiments of the rounder bar can incorporate a floating foot which allows the rounder bar to better conform to the upper surface of a conveyor belt. In a preferred embodiment, the rounder bar incorporates a cavity or slot along the length of its bottom surface. A foot, formed of flexible material, is configured for being received in the cavity with the foot being vertically movably retained within the cavity so that the foot can move between a low, extended position, and a high, compressed position, where the foot is partially retracted into the slot. Additionally, the upper portion of the slot incorporates a biasing means, such as springs, silicon rubber, visco-elastic material, etc, to urge the foot into engagement with the upper surface of the belt of the conveyor.

A preferred method of the present invention includes the steps of: (1) providing a conveyor having an endless belt moving in a first direction for transporting dough pieces thereon; (2) mounting a rounder bar over said belt angularly displaced from the first direction and engaging the belt, with the rounder bar being formed of oil filled plastic material incorporating a concavically shaped shaping surface; and, (3) providing a series of dough pieces at spaced intervals along the belt so that each of the dough pieces contacts the rounder bar and is drawn down the length of the rounder bar along the shaping surface and takes on a rounded shape.

An alternative method of the present invention includes the steps of: (1) depositing dough pieces in sequence on a surface conveyor; (2) advancing the conveyor with the dough pieces deposited thereon along a processing path; (3) as the dough pieces advance with the surface conveyor, engaging the dough pieces with ribs formed on an elongated concave shaping surface of a rounder bar and rotating the dough pieces against the surface conveyor and the ribs of the concave shaping surface; and (4) as the dough pieces rotate against the surface conveyor and the concave shaping surface, first compressing the dough pieces between surfaces of progressively smaller distances between the surfaces, at a slope of at least a 1 to 2.5 decrease in height to length of the concave shaping surface, and then compressing the dough pieces between surfaces of progressively greater distances between the surfaces.

Other objects, features and advantages of the present invention will become apparent upon reading the following specification, when taken in conjunction with the accompanying drawings.

BRIEF DESCRIPTION OF THE SEVERAL VIEWS OF THE DRAWINGS

The accompanying drawings incorporated in and forming a part of the specification illustrate several aspects of the present inventions, and together with the description serve to explain the principles of the inventions. The components in the drawings are not necessarily to scale, emphasis instead being placed upon clearly illustrating principles of the present inventions.

FIG. 2 is a perspective view of a preferred embodiment of the rounder bar of the present invention;

FIG. 3 is a perspective view of an alternative embodiment of the present invention;

FIG. 4 is a perspective view of an alternative embodiment of the present invention;

FIGS. 5A–5G are cross-sectional views of the embodiment of the present invention shown in FIG. 4, taken along section lines 5A—5A through 5G—5G;

FIG. 6 is a cut-away side view of a portion of an embodiment of the present invention, showing detail of surface grooves formed in the shaping surface;

FIG. 7 is a partially exploded view of an embodiment of the present invention incorporating a floating foot.

DETAILED DESCRIPTION OF THE PREFERRED EMBODIMENT

Figure 1:
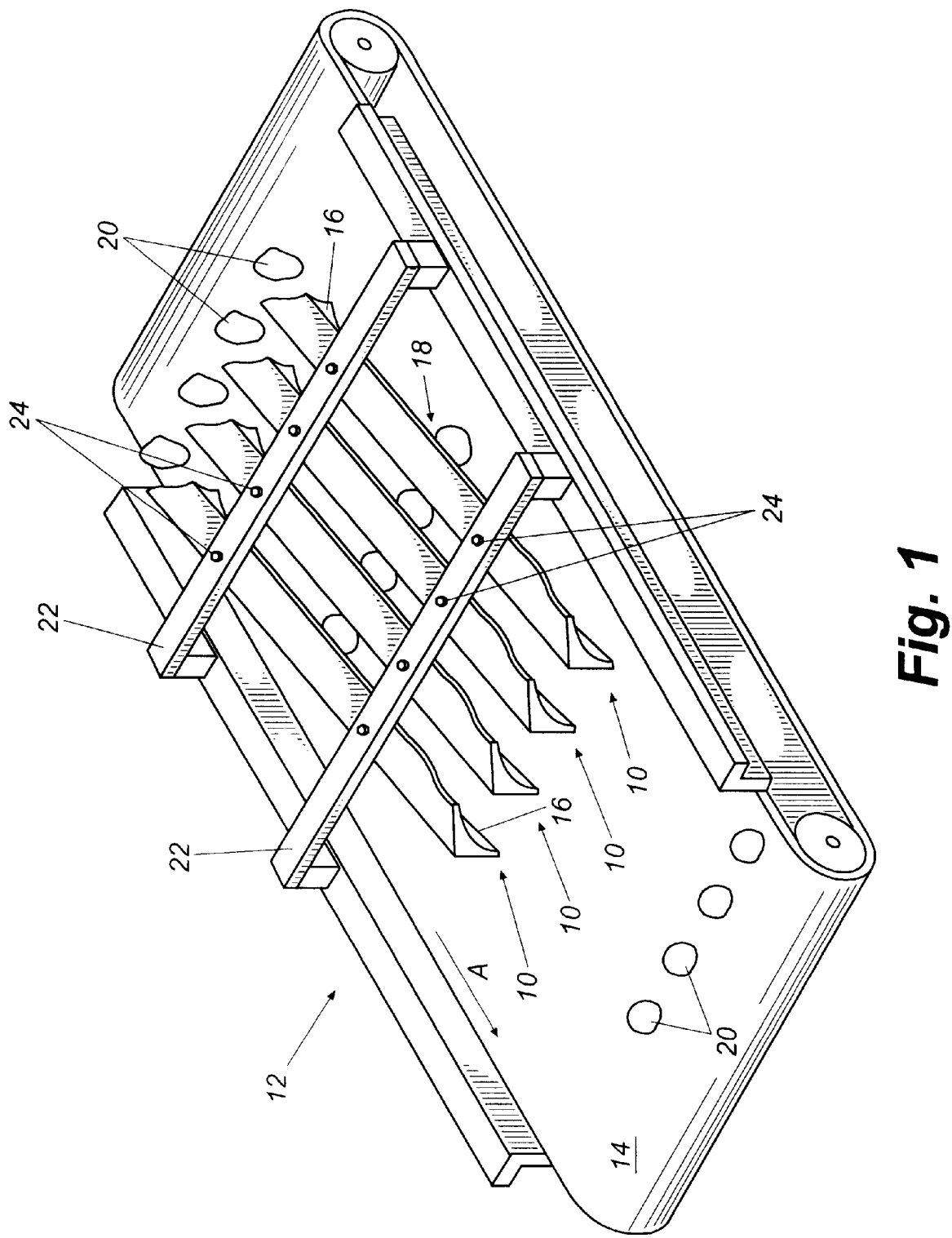
FIG. 1 is a perspective view of a plurality of rounder bars of the present invention mounted above a representative endless belt-type conveyor.
Figure 5G:
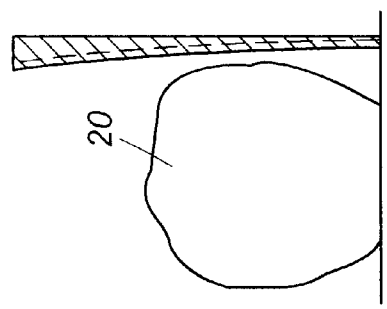
Figure 5E:
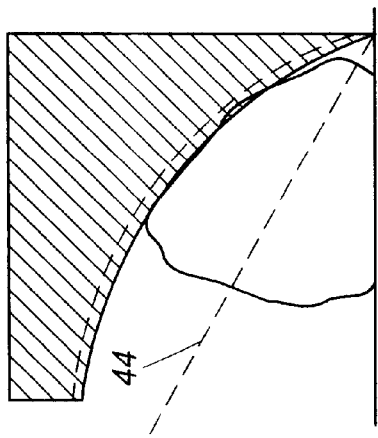
Figure 5F:
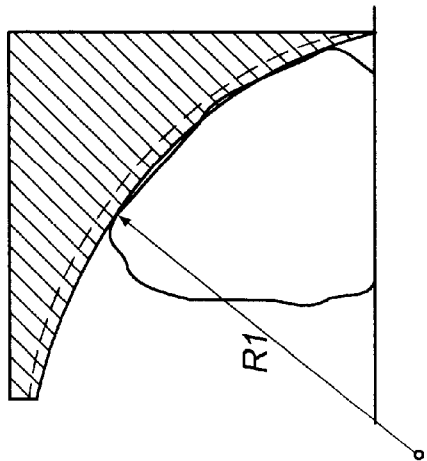
Figure 5C:
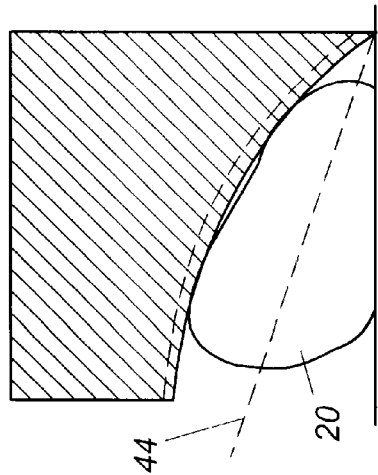
Figure 5D:
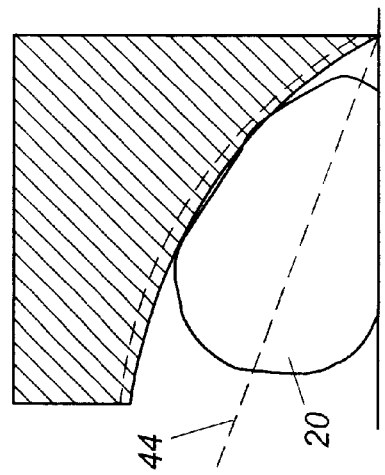

Reference will now be made in detail to the description of the present invention as illustrated in the drawings with like numerals indicating like parts throughout the several views. As shown in FIG. 1, the rounder bar 10 of the present invention is arranged in a spaced parallel orientation above a conveyor section 12 with others of the rounder bars 10. The rounder bars 10 typically are disposed along the length of the conveyor 12 and are angularly offset from the direction of advancement of the belt 14 (direction A), with each rounder bar having a concave shaping surface 16 that forms an elongated pocket 18 with the conveyor belt so that dough pieces 20 being advanced along a processing path by the belt 14 are simultaneously urged into contact with the shaping surface of a rounder bar 10 for shaping. The rounder bars 10 preferably are maintained in the aforementioned orientation by a series of mounting brackets 22 which extend across the conveyor 12 and which each incorporate adjustment mechanisms 24, such as conventional bolt/nut assemblies which allow for vertical adjustment of the rounder bars 10 relative to the upper surface of the belt. Typically, the adjustment mechanisms 24 threadedly engage mounting holes 26 (i.e. FIG. 2) which are arranged in mounting surface 28 of the rounder bar 10. Additionally, a backing angle 29 (FIG. 3) formed of a rigid material, such as aluminum, can be provided for adding structural support to the rounder bar as well as for forming a portion of a cavity along the bottom edge of the rounder bar for mounting a floating foot (described in detail hereinafter). In embodiments incorporating a backing angle 29, adjustment mechanisms 24 typically engage the backing angle.

Rounder bar 10 preferably is configured as an elongated body formed of an oil-filled plastic material, such as TYVAR® Oil Filled, manufactured by Poly Hi Solidur, Inc. of Fort Wayne, Ind., although other materials, such as ultra high-molecular weight polyethylene (UHMW), for example, can be used. The oil-filled plastic material has been found to produce a shaping surface that is slippery with respect to dough and tends not to stick to the dough as the dough pieces 20 engage shaping surface 16 of the rounder bar. The oil-filled plastic material also tends to release sticky dough better than non-oil-filled materials, thus reducing the tendency for dough piece doubling (e.g. two dough pieces colliding and then sticking together). This is due to the physical characteristics of the oil-filled plastic material which exudes an oil additive, thereby allowing the material to exhibit a static coefficient of friction of approximately 0.208, a dynamic coefficient of friction of approximately 0.195, and superior release characteristics. Additionally, oil-filled plastic material, such as TYVAR® Oil Filled processed from Montell 1900 CM and Hoechst Calenese Hostalen GUR resin, currently meets FDA requirements for food contact operations.

As shown in FIGS. 2–4, rounder bar 10 includes: an entrance end 30, which is sized and shaped to receive a dough piece; a compression section 32, which is adapted to cause a dough piece to rotate as a homogeneous mass of dough and which includes an area of maximum compression 34; an expansion section 36; and, a exit end 38. Additionally, some embodiments of the rounder bar (i.e. FIGS. 3 and 4) can incorporate a release section 40, oriented between their respective expansion sections 36 and exit ends 38 (the embodiment depicted in FIG. 4 is, otherwise, identically shaped as the embodiment depicted in FIG. 2).

In the embodiments of FIGS. 2–4, the shaping surface 16 preferably is configured as a semi-spiraling concave surface which extends substantially down the length of the rounder bar from the entrance end 30 to its exit end 38. The concave shaping surface 16 (FIGS. 5A–5F) preferably is formed with a substantially constant radius $R_1$, where $R_1$ preferably is approximately 2.75 inches. Shaping surface 16 forms an elongated pocket 18 between the belt 14 and the shaping surface, with the height and cross-sectional area of the pocket 18 between the belt 14 and the shaping surface 16 varying down the length of the rounder bar. The height and cross-sectional area of the pocket, as calculated between the shaping surface 16 and the upper surface of the belt 14, decreases from the entrance end 30 through the compression section 32 to a minimum cross-sectional area at the area of maximum compression 34, which is located between approximately 3 inches and approximately 6 inches, preferably approximately 4 inches, from the entrance end. After a dough piece passes the area of maximum compression 34 and enters the expansion section 36, the height and cross-sectional area of the pocket formed by the shaping surface and the conveyor belt gradually increases in the expansion section 36 toward the exit end 38. As shown in the embodiment of FIG. 4, the height and cross-sectional area of the pocket also increases in release section 40, described in detail hereinafter.

As shown in FIGS. 2–4, rounder bar 10 also can incorporate a relief cut 42 formed at its entrance end for allowing a dough piece to more easily transition into the compression section 32. Once a dough piece 20 is brought into engagement with the compression section 32 of the shaping surface 16 by the belt of a surface conveyor, the dough piece 20 begins to rotate about a rotational axis 44 (FIGS. 5A–5G) as it progresses along the rounder bar. In the compression section 32, the height of the pocket 18 progressively decreases from about 1⅝ inches to about ¾ inch along the rounder bar, thereby changing the shape of the dough piece 20 to an oval shape with an approximately horizontal longitudinal axis. Downward pressure is increased against the exterior surface of the dough piece, thereby causing the rotational axis 44 of the dough piece to depress from an upward attitude toward a more acute angle with the belt 14 of the surface conveyor. After departing the compression section 32, the height of the pocket 18 progressively increases through the expansion section 36 from about ¾ inch to about 2 inches along a length of travel on the shaping surface of about 48 inches, and downward pressure applied by the shaping surface on the dough piece 20 is progressively decreased, thereby causing the rotational axis 44 of the dough piece to increase toward a less acute angle with the belt of the surface conveyor. The change of the axis of rotation and the concave shape of the shaping surface 16 assures that all surfaces of the dough piece will be contacted on the rounder bar.

Preferred embodiments of the rounder bar 10 can incorporate a release section 40 (FIGS. 3 and 4) arranged at its exit end 38. With reference to FIG. 4, the release section 40 can include an extended or tapered portion 41 of the mounting surface 28 which is configured to blend an overhanging edge 43 of the mounting surface 28 into the shaping surface 16, thereby creating an extended shaping surface 46 which is substantially normal to the belt 14. This arrangement releases the downward, compressing force which is normally imparted to the exterior surface of a dough piece. So configured, as a dough piece 20 progresses along the rounder bar and passes under the tapered portion 41, the downward, compressing force upon the dough piece is quickly released, thereby tending to cause the dough piece to release from the extended shaping surface 46 and to rapidly expand, thus allowing the dough piece to take on an approximately spherical shape as the dough piece naturally tends to seek a form which has a minimum exterior surface area.

As shown in FIG. 3, some embodiments of the release section 40 can include an extended shaping surface 46 which is formed as an extension of the shaping surface of the expansion section 36. The extended shaping surface 46 cooperates with a tapered portion 41 of the mounting surface 28 so that as the height and cross-sectional area of the pocket 18 increase along the extended shaping surface 46, the downward, compressing force upon a dough piece 20 is gradually released until the dough piece emerges from underneath the tapered overhanging edge 43 of mounting surface 28. Once the dough piece sufficiently emerges from the overhanging edge 43, the downward, compressing force upon the dough piece is quickly released, thereby causing the dough piece to release from the extended shaping surface 46 of the release section 40 and to rapidly expand, thus allowing the dough piece to take on an approximately spherical shape.

Preferred embodiments of the rounder bar 10 include a shaping surface 16 which incorporates a series of alternating parallel grooves 48 and ribs 50 (FIG. 6) running substantially normal to the length of the rounder bar. Since the material of the rounder bar typically is a low friction material, such as an oil filled plastic, UHMW polyethylene, etc, the grooves and ribs grip the skin of a dough piece as the dough piece is brought into engagement with the shaping surface 16 by the belt 14. This "gripping" of the dough piece allows the dough piece to rotate along the length of the rounder bar, thereby allowing the dough piece to be shaped by the rounder bar. So configured, the combination of the material of the rounder bar and the grooves and ribs provides a suitable balance between the minimum amount of friction required to stimulate proper rotation of a dough piece relative to the shaping surface and belt, and the maximum amount of friction which should ensure proper release of a dough piece from the shaping surface after shaping by the rounder bar.

As shown in FIG. 6, a preferred embodiment of grooves 48 are each formed in cross-section with a substantially sharp pointed rib 50 and a substantially rounded valley 52 disposed between each rib. The ribs and grooves typically are arranged at an interval of between approximately 10 and approximately 40 grooves per inch (preferably 16 grooves per inch, with each groove having a depth of 0.015 inches, for embodiments formed of oil-filled plastic material, and 30 grooves per inch for embodiments formed of UHMW polyethylene). Additionally, the cross-section of each rib 50 preferably is configured with an included angle 54 of between approximately 45 degrees and approximately 90 degrees. Formation of the grooves and ribs can be facilitated in a conventional manner by the use of a standard 0.030, 120 degree tool, for instance.

Figure 8:
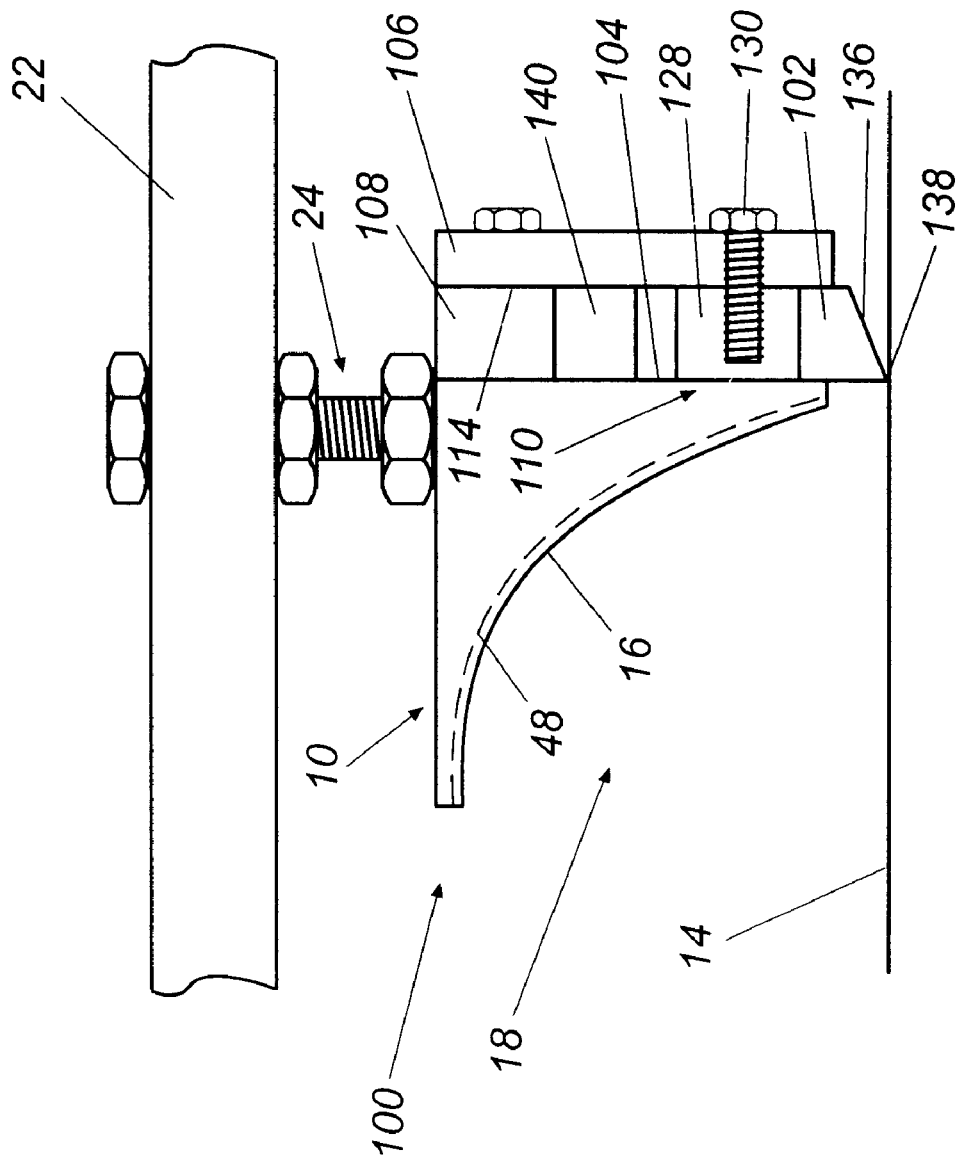
FIG. 8 is a cross-sectional view of the embodiment of the present invention shown in FIG. 7, taken along section line 8—8.

As shown in FIGS. 7 and 8, and with reference to the conveyor of FIG. 1, the rounder bar 10 can be incorporated into a rounder bar assembly 100 which preferably includes an elongated foot 102, with the shaping surface 16 and a lower portion of the foot 102 forming the pocket 18 for engaging and shaping dough pieces 20 as the dough pieces are drawn down the length of the rounder bar by the belt 14 of the conveyor. Rounder bar 10 includes a rear face 104 which cooperates with a backing plate 106 and a retainer 108 to form a slot or cavity 110 which receives the foot 102. Alternatively, such as shown in the embodiment of FIG. 3, the rounder bar 10 can be configured with a recess 112, formed along a lower edge of rear face 104, which cooperates with backing angle 29 to form cavity 110.

Preferably, backing plate 106 includes an inner face 114 and opposing end walls 116 which extend outwardly from the inner face. A series of spaced holes 118 are arranged along the length of backing plate 106 and are adapted to align with a series of spaced holes 120 arranged through retainer 108 (if applicable) and into mounting holes (not shown) formed in the rear face 104 of the rounder bar 10 so that fasteners 122, such as bolts, can be placed through each of the holes 118, then through each of the holes 120 (if applicable), and then can be threadedly fastened to rounder bar 10. So configured, cavity 110 is formed between rear face 104, inner face 114 and either a surface 124 of the retainer 108, or a surface 126 (FIG. 3) is of the recess 112.

Preferably, foot 102 is movably mounted in the lower portion of the cavity 110 by a series of slots 128, formed through the foot, which cooperate with a series of mounts 130, such as bolts. In the embodiment of FIGS. 7 and 8, the mounts 130 engage threaded holes 132 formed in the lower portion of backing plate 106 and terminate within the slots 128. So configured, the foot is retained within the cavity 110 while being movable about the mounts, thereby allowing the foot to be displaced into the cavity 110. Additionally, the foot 102 preferably incorporates a lower face 136 which is downwardly inclined from the backing plate 106 toward the shaping surface 16 to form a toe 138. As such, the toe 138 functions as the preferred point of contact between the rounder bar assembly 100 and the belt 14 of the conveyor.

Biasing means 140, such as visco-elastic material, i.e. SORBOTHANE®, manufactured by Sorbothane, Inc. of Kent, Ohio, is arranged in the cavity 110 and is retained therein by the various faces of the cavity as well as the opposing end walls 116. In a preferred embodiment, the visco-elastic material is configured as an elongated strip or strips, with adjacent ends of the strips abutting each other; however, numerous other configurations can be utilized in order to minimize any air pockets in the cavity 110. It should be noted that visco-elastic material exhibits some of the same physical characteristics as a fluid and, in particular, the material possesses the ability to transmit pressure exerted on a portion of the material by displacing the force laterally to other portions of the material. This characteristic is extremely beneficial when the material is encased within an enclosure, such as cavity 110, because the encased visco-elastic material behaves similar to a hydraulic system such that any force exerted upon the visco-elastic material is substantially equally displaced throughout the material. Therefore, by reducing the amount of air pockets within the cavity, the visco-elastic material will be unable to expand into the air pockets in response to a force, thereby applying any deformation forces to the foot 102 so that the toe of the foot can conform to the upper surface of the belt 14. In other embodiments, biasing means such as sponge rubber and various spring assemblies can be utilized.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A rounder bar for mounting over a conveyor having an endless conveyor belt for transporting dough pieces thereon along a processing path, said rounder bar comprising:

an elongated body having a concavically shaped elongated shaping surface formed thereon, said body extending diagonally across the conveyor belt, said shaping surface being formed of an oil filled plastic material, said shaping surface configured to form an elongated dough shaping pocket with the conveyor belt, said pocket being formed to receive and shape a dough piece transported along the convey belt;

said shaping surface having, in sequence, along its length an entrance end, a compression section, an area of maximum compression, an expansion section and an exit end, said compression section configured such that dough pieces first engage said shaping surface of said compression section at said entrance end and begin to rotate against said compression section and the conveyor belt about a rotational axis, said compression section forming a progressively reduced height of said shaping surface with the conveyor belt along the processing path such that said compression section exerts an increasing downward force against the dough pieces as the dough pieces travel through said compression section toward said area of maximum compression, said expansion section forming a progressively increased height of said shaping surface with the conveyor belt along the processing path such that said expansion section exerts a decreasing downward force to dough pieces as the dough pieces travel along said expansion section toward said exit end.

2. The rounder bar of claim 1, wherein said shaping surface has an array of alternating parallel ribs and grooves each extending approximately normal to the length of said elongated body.

3. The rounder bar of claim 1, wherein said area of maximum compression is arranged no greater than 6 inches from said entrance end.

4. The rounder bar of claim 1, wherein said shaping surface has a release section, said release section being oriented between said expansion section and said exit end and forming a progressively increased height of said shaping surface with the conveyor belt along the processing path such that said release section exerts a decreasing downward force to dough pieces as the dough pieces travel along said release section toward said exit end.

5. The rounder bar of claim 1, wherein said shaping surface is configured such that an angle formed between the rotational axis of a dough piece and the belt of the conveyor as the dough piece engages said shaping surface is a minimum at said area of maximum compression and a maximum at said exit end.

6. The rounder bar of claim 1, wherein said shaping surface is configured as a semi-spiraling shaping surface.

7. The rounder bar of claim 1, wherein said rounder bar has an elongated foot for frictionally engaging the belt, and wherein said body has an elongated slot formed therein, said elongated slot extending lengthwise along at least a portion of said body, said foot being movably engaged within said slot between a compressed position and an extended position, in said compressed position, at least a portion of said foot extending from said slot, said foot being biased toward said extended position.

8. The rounder bar of claim 2, wherein said grooves are each formed with a substantially rounded valley and a substantially sharp point disposed between each valley.

9. The rounder bar of claim 2, wherein said grooves are arranged at an interval of between approximately 10 and approximately 40 grooves per inch.

10. The rounder bar of claim 7, wherein said slot is defined by walls, and wherein said foot is biased toward said extended position by a visco-elastic material arranged in said slot, said visco-elastic material being encased by said walls and said foot, said foot frictionally engaging the belt such that an upwardly directed force transmitted from the belt to a portion of said foot substantially equally displaces throughout said visco-elastic material as a deformation force, whereby at least a portion of said deformation force is downwardly directed to said foot such that said foot conforms to the upper surface of the belt.

11. The rounder bar of claim 9, wherein said grooves are arranged at an interval of approximately 16 grooves per inch.

12. A method for shaping dough pieces comprising:

providing a conveyor having an endless belt moving in a first direction for transporting dough pieces thereon;

mounting a rounder bar over said belt angularly displaced from said first direction and engaging the belt, said rounder bar comprising an elongated body having a concavically-shaped shaping surface, said shaping surface being formed of oil filled plastic material and configured to form a pocket with the belt of the conveyor and to receive and shape dough pieces transported along the belt of the conveyor, said shaping surface having an entrance end, a compression section, an area of maximum compression, an expansion section and an exit end, said compression section disposed between said entrance end and said area of maximum compression; and providing a series of dough pieces at spaced intervals along said belt such that each of said dough pieces contacts said rounder bar and is drawn down the length of said rounder bar along said shaping surface such that said dough pieces take on a rounded shape.

13. The method of claim 12, wherein said area of maximum compression is arranged no greater than 6 inches from said entrance end.

14. The method of claim 12, wherein said body further comprises an elongated slot, said elongated slot extending lengthwise along the bottom of said body, movably maintaining a foot within said slot between a compressed and an extended position such that at least a portion of said foot extends from said slot and beyond said body when said foot is in said compressed position, and biasing the foot out of said slot and toward the belt such that the foot urges into frictional engagement with the belt.

15. A method for shaping dough pieces comprising:

depositing dough pieces in sequence on a surface conveyor;

advancing the conveyor with the dough pieces deposited thereon along a processing path;

as the dough pieces advance with the surface conveyor, engaging the dough pieces with ribs formed on an elongated concave dough shaping surface of a rounder bar and rotating the dough pieces against the surface conveyor and the ribs of the concave dough shaping surface;

as the dough pieces rotate against the surface conveyor and the concave dough shaping surface, first compressing the dough pieces between surfaces of progressively smaller distances formed by the shaping surface and the upper surface of the surface conveyor along a length of the shaping surface of no greater than 6 inches, at a slope of at least a 1 to 2.5 decrease in height to length of the concave shaping surface, and then compressing the dough pieces between surfaces of progressively greater distances between the surfaces.

* * * * *